(12) United States Patent
Morishige et al.

(10) Patent No.: US 7,917,939 B2
(45) Date of Patent: Mar. 29, 2011

(54) IPSEC PROCESSING DEVICE, NETWORK SYSTEM, AND IPSEC PROCESSING PROGRAM

(75) Inventors: Takehiro Morishige, Kawasaki (JP);
Jousuke Matsuki, Yugawara (JP);
Masashi Yano, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 929 days.

(21) Appl. No.: 11/776,079

(22) Filed: Jul. 11, 2007

(65) Prior Publication Data

US 2008/0052756 A1 Feb. 28, 2008

(30) Foreign Application Priority Data

Aug. 22, 2006 (JP) ................................ 2006-225491

(51) Int. Cl.
*G06F 17/30* (2006.01)
(52) U.S. Cl. ............ 726/1; 707/796; 707/800; 707/802; 713/153; 713/154
(58) Field of Classification Search .................... 726/1; 713/153–154; 707/790, 796, 800, 802
See application file for complete search history.

(56) References Cited

U.S. PATENT DOCUMENTS

| | | | | |
|---|---|---|---|---|
| 6,226,634 | B1 * | 5/2001 | Ogihara et al. ........................ 1/1 |
| 6,330,562 | B1 * | 12/2001 | Boden et al. .................. 713/167 |
| 6,988,106 | B2 * | 1/2006 | Enderwick et al. .................... 1/1 |
| 7,392,241 | B2 * | 6/2008 | Lin et al. ................................ 1/1 |
| 2001/0042204 | A1 * | 11/2001 | Blaker et al. .................. 713/165 |
| 2003/0023846 | A1 * | 1/2003 | Krishna et al. ................. 713/162 |
| 2005/0027723 | A1 * | 2/2005 | Jones et al. .................... 707/100 |

OTHER PUBLICATIONS

RFC:2409, "The Internet Key Exchange (IKE)", Harkins, et al., Nov. 1998.
RFC: 2401, "Security Architecture for the Internet Protocol", Kent, et al., Nov. 1998.

* cited by examiner

*Primary Examiner* — Edan Orgad
*Assistant Examiner* — Yin-Chen Shaw
(74) *Attorney, Agent, or Firm* — Brundidge & Stanger, P.C.

(57) ABSTRACT

Security policy databases capable of being fast retrieved while securing sequentiality. An IPSec processing device of the present invention performs communications by encrypting IP packets exchanged between a first IP network and a second IP network. The IPSec processing device includes a security policy database that stores security policies. The security policy database includes first, second, and third security policy databases. The first and third security policy databases include a linear list structure, and the second security policy database includes a hash list structure. The IPSec processing device, when performing at least one of transmission and reception of the IP packet, retrieves a security policy in the order of the first, second, and third security policy databases.

13 Claims, 12 Drawing Sheets

FIG. 3

| 501 | 502 | 503 | 504 | 505 | 506 | 507 | 508 | 510 | 511 | 512 | 513 | 514 | 515 | 517 | 518 | 519 | 520 | 521 | |
|---|---|---|---|---|---|---|---|---|---|---|---|---|---|---|---|---|---|---|---|
| INNER SOURCE IP Address | Prefix LENGTH | SOURCE PORT NUMBER | INTERNAL DESTINATION IP Address | Prefix LENGTH | DESTINATION PORT NUMBER | PROTOCOL NUMBER | DIRECTION | POLICY | SECURITY PROTOCOL | ENCAPSULATION MODE | OUTER SOURCE IP Address | OUTER DESTINATION IP Address | SPI VALUE | SEARCH TYPE | PRIORITY | USER MANAGEMENT IDENTIFIER | NEXT SP POINTER FOR USER MANAGEMENT | NEXT SP POINTER FOR PACKET TRANSFER | |
| 100.101.101.102.103 | 32 | any | 100.101.101.102.104 | 32 | any | UDP | IN-BOUND | By-pass | - | - | - | - | - | PRELIMINARY | 0 | 0x1234 | 0x.... | 0x.... | 500-1 |
| 3ffe:100:200::1 | 128 | any | 3ffe:100:200::2 | 128 | any | TCP | OUT-BOUND | IPsec | ESP | Tunnel | 3ffe::5000 | 3ffe::4000 | 0x222 | FAST | 100 | 0x4321 | 0x.... | 0x.... | 500-2 |
| any | any | any | any | any | any | any | FORWORD | DROP | - | - | - | - | - | POST | 0 | 0x0000 | 0x.... | 0x.... | 500-n |

509 spans columns 501–507; 516 spans 508–515; 522 spans 517–521; 500 overall.

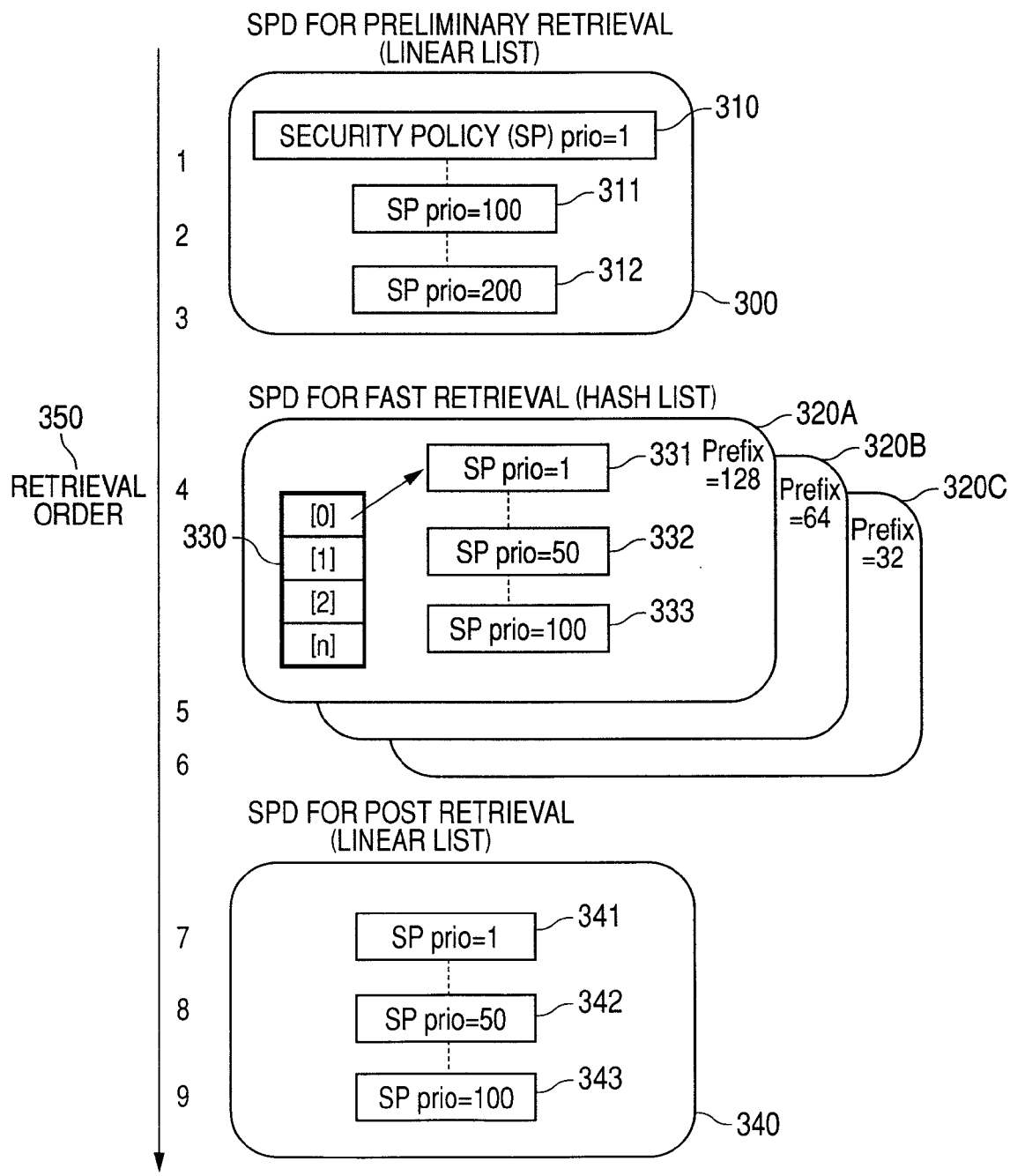

IPSEC PROCESSING DEVICE, NETWORK SYSTEM, AND IPSEC PROCESSING PROGRAM

CLAIM OF PRIORITY

The present application claims priority from Japanese application JP 2006-225491 filed on Aug. 22, 2006, the content of which is hereby incorporated by reference into this application.

FIELD OF THE INVENTION

The present invention relates to an IPSec processing device that applies IPSec to IP packets, and more particularly to technology for storing security policies.

BACKGROUND OF THE INVENTION

Recently, more and more communication networks have been made into IP, and IP communication networks have been widely used as a social infrastructure, centering around the Internet. Therefore, with packet communications including personal information and commercial transaction information, and the like through the Internet, securing security in communication paths has become indispensable to prevent eavesdropping and forging.

Accordingly, as a technology concerning communication security of the Internet, security architecture for the Internet protocol discussed in the Internet Engineering Task Force is widely known (S. Kent, et al., "Security Architecture for the Internet Protocol" RFC2401, November, 1998).

In IPv6 expected to come into widespread use in future, IPSec (IP Security Protocol) is equipped as standard. Furthermore, as communication networks is more and more made into IP, it is anticipated that the number of connected terminals and the number of users increase, and access modes are complicated.

In IPSec, usually, safe communications are achieved by performing authentication and encryption processing by common key between a sender and a receiver. Therefore, it is necessary to predetermine between a sender and a receiver key information necessary to apply IPSec, authentication algorithm information, encryption algorithm information, and parameter information necessary for algorithm. These arrangements are referred to as security association (SA), and stored in a security association database (SADB).

Furthermore, the IPSec processing device stores security policies (SP) stipulating IPSec processing to be applied, according to information such as an IP address included in an inputted/outputted IP packet. SPs are stored in a security policy database (SPD).

The IPSec processing device compares conditions defined in an SP with information such as an IP address in an inputted/outputted IP packet, and extracts SA corresponding to SP meeting the conditions. The IPSec processing device authenticates or encrypts the inputted/outputted IP packet, based on the extracted SA.

Negotiations are made between IPSec processing devices before communication is started, and the SPs and SAs described previously are automatically created. As this technology, IKE (Internet Key Exchange) is known. (D. Harkins, et al., "The Internet Key Exchange (IKE)" RFC2409, November 1998).

SUMMARY OF THE INVENTION

Encryption communications to which IPSec technology is applied are enabled by sharing SPD and SADB between communicating devices. The IPSec processing device consults SPD and applies IPSec processing, based on information included in a transmitted/received IP packets.

SPD generally has a linear structure. SPD of the linear structure enables sequentiality-conscious settings because sequential retrieval in one direction. However, when there are many equipments subject to encryption communications with IPSec applied, since the number of entries added to a linear list increases, the number of comparisons between an SPD and IP addresses and other information (selector information) of IP packets increases. As a result, there has been a problem in that a delay occurs in retrieval speed and transfer speed of IP packets is delayed.

On the other hand, an SPD of a hash structure increases retrieval speed by reducing the number of retrievals of SP entries. However, when IP packets are filtered, it has been impossible to secure the sequentiality of SPs stored in a hash list.

Therefore, to apply security policies a manager intends, a method by which the manager adds an SPD with conscious sequentiality, and a method by which the manager adds an SPD without being conscious of sequentiality have been provided, and it has been necessary to apply an appropriate retrieval method to the respective SPDs.

Furthermore, an IP address of a target terminal is usually used for the retrieval of an SPD, posing problems such as a large number of SPD setting items, and cumbersome management of SPD reference, addition, and deletion.

An IPSec processing device according to one typical aspect of the present invention encrypts IP packets for communication between a first IP network and a second IP network. The IPSec processing device includes a security policy database that stores security policies. The security policy database includes a first security policy database, a second security policy database, and a third security policy database. The first security policy database and the third security policy database include a linear list structure. The second security policy database includes a hash list structure. The IPSec processing device, when performing at least one of transmission and reception of the IP packet, retrieves a security policy to be applied to the IP packet in the order of the first security policy database, the second security policy database, and the third security policy database.

According to one aspect of the present invention, security policies can be fast retrieved from a security policy database while securing their sequentiality even when there are a large number of security policies.

BRIEF DESCRIPTION OF THE DRAWINGS

FIG. 3 is a drawing illustrating the structure and a retrieval order of a security policy database of a first embodiment;

FIG. 4 is a block diagram of a user information management table of a first embodiment;

DETAILED DESCRIPTION OF THE PREFERRED EMBODIMENTS

Preferred embodiments of the present invention will be described with reference to the accompanying drawings.

First Embodiment

Figure 1A:
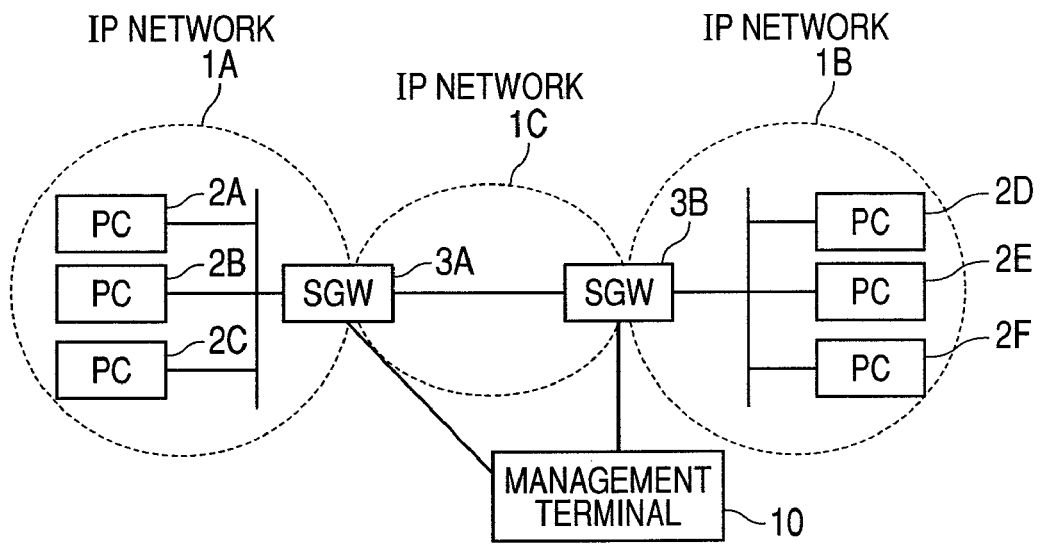
FIG. 1A is a drawing showing a network configuration of a first embodiment.

FIG. 1A is a drawing showing a network connection configuration of an IPSec processing devices in Internet VPN of a first embodiment. In the network connection configuration shown in FIG. 1A, an IP network 1A and an IP network 1B communicate with each other via an IP network 1C of the Internet and the like. The IP network 1A is configured by PCs (2A to 2C) and the like, and connected with external networks via a security gateway (hereinafter referred to as SGW) 3A. Likewise, the IP network 1B is configured by PCs (2D to 2F) and the like, and connected with external networks via SGW 3B.

In the network configuration shown in FIG. 1A, PCs (2A to 2F) and SGW (3A, 3B) may correspond to IPSec processing devices. For example, when VPN is set for direct communication between the PC 2A included in the IP network 1A and the PC 2D included in the IP network 1B, the PC 2A and the PC2D correspond to IPSec processing device. On the other hand, when VPN is set for only a communication path of the IP network 1C between the IP network 1A and the IP network 1B, the SGW 3A and the SGW 3B become IPSec processing devices. In this case, in the SGW 3A and SGW 3B, the management of SPD such as the registration and deletion of SPs is performed by the management terminal 10.

Figure 1B:
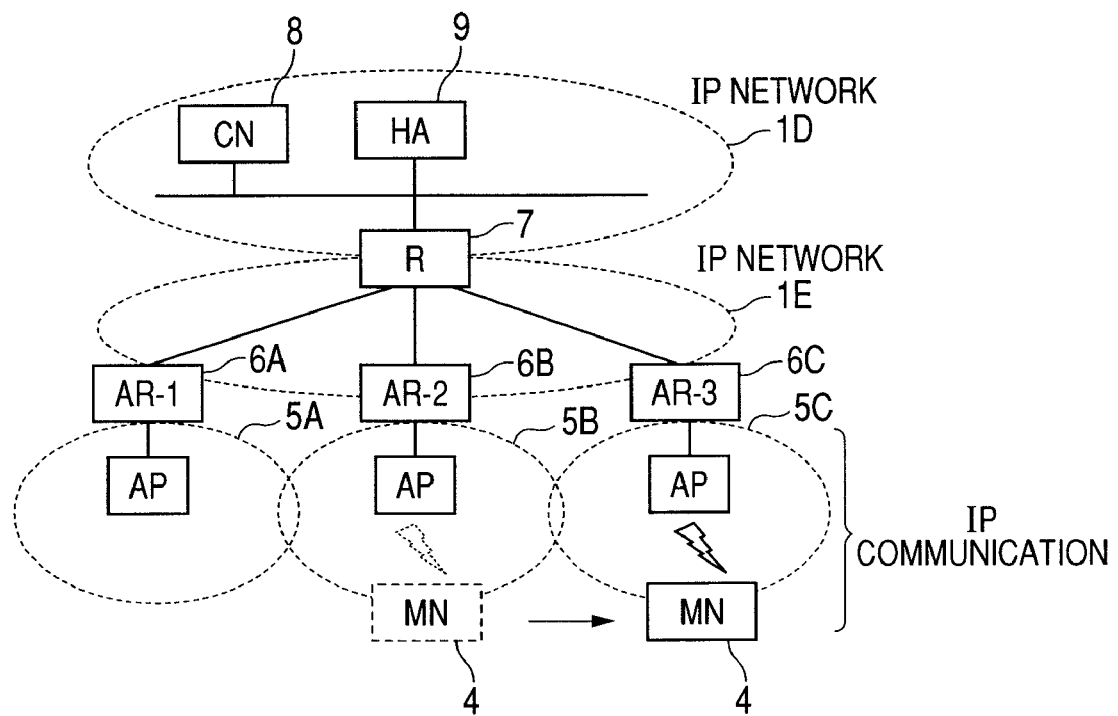
FIG. 1B is a drawing showing a variant of a network configuration of a first embodiment.

FIG. 1B is a drawing showing the configuration of a mobile unit IP communication network to which MobileIP of the first embodiment is applied. The network shown in FIG. 1B comprises a home network 1D, a packet relay network 1E, and in-zone networks (5A, 5B, 5C).

The home net 1D includes a home agent (hereinafter referred to as HA) 9 that transfers packets to a mobile terminal (hereinafter referred to as MN) 4, and a correspondent node (hereinafter referred to as CN) 8 that servers as a communication party of the MN 4. The in-zone networks (5A, 5B, 5C) is a network that the MN 4 connects in its moving destination. The packet relay network 1E is located between the in-zone networks (5A, 5B, 5C) and the home network 1D.

A router 7 is located in the boundary of the home network 1D and the packet relay network 1E. Access routers (6A, 6B, 6C) are located in the boundary of the packet relay network 1E and the in-zone networks (5A, 5B, 5C).

The MN 4 makes IP connection with the in-zone networks (5A, 5B, 5C) via access points (hereinafter referred to as AP) connected to ARs (6A, 6B, 6C). The in-zone networks (5A, 5B, 5C) are wireless networks, and the MN 4 is connected to the ARs (6A, 6B, 6C) by PPP (Point to Point Protocol) via APs connected to the AR (6A, 6B, 6C).

In the network configuration shown in FIG. 1B, the MN 4, HA 9, CN 8, and ARs (6A, 6B, 6C) correspond to IPSec processing devices. In this case, as connection form, IPSec communication is applied in a communication path between the HA 9 and MN 4, or a communication path between the CN 8 and MN 4. When the IP network in which the access routers (6A, 6B, 6C) are located is in a home, the access routers (6A, 6B, 6C) correspond to home routers. IPSec communication is applied in communication paths between the access routers (6A, 6B, 6C) and the HA 9, or CN 8.

Figure 2A:
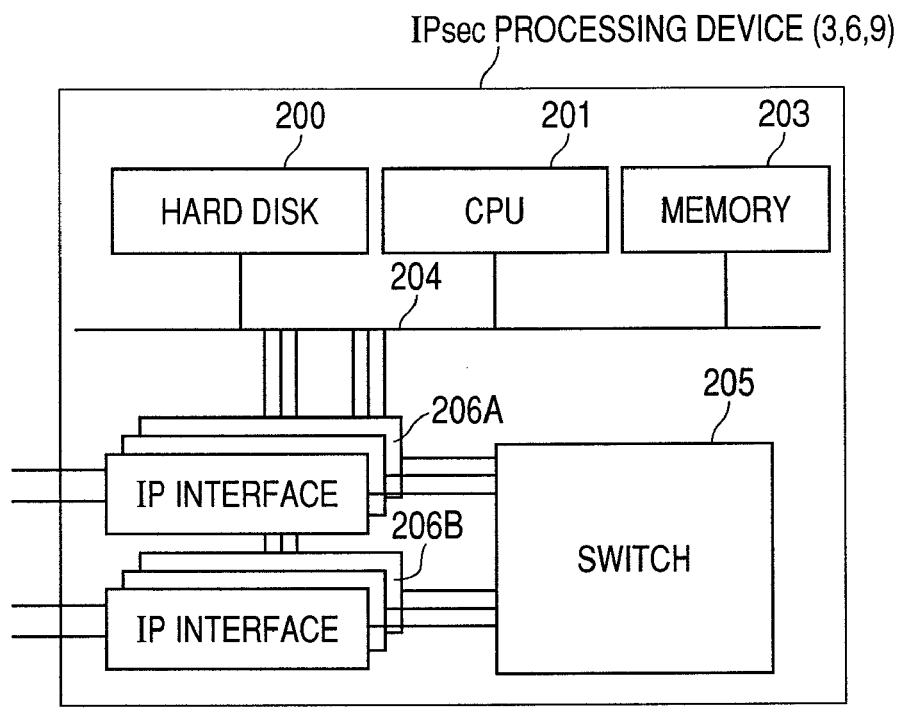
FIG. 2A is a hardware configuration drawing of an IPSec processing device of a first embodiment.
Figure 2B:
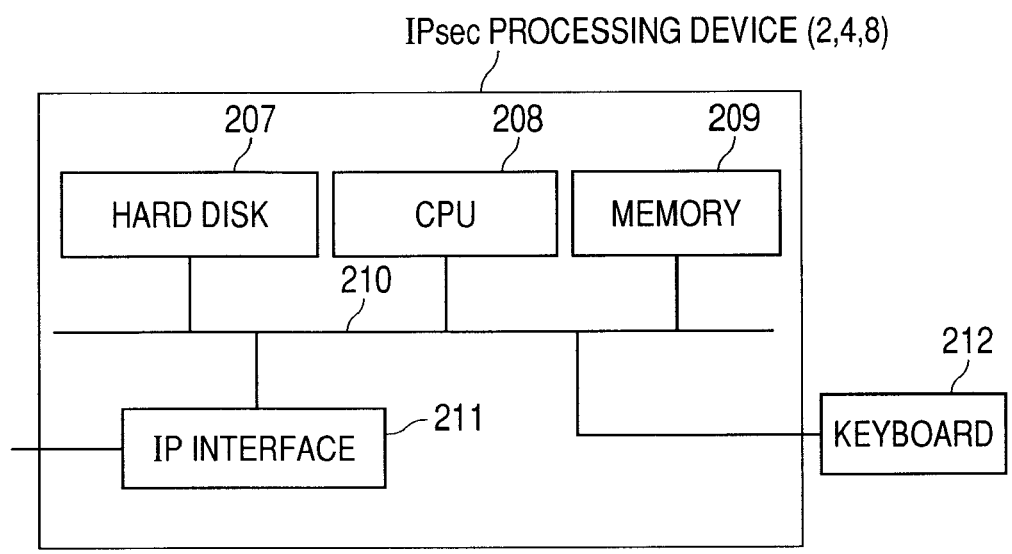
FIG. 2B is a hardware configuration drawing of an IPSec processing device of a first embodiment.

FIGS. 2A and 2B are hardware configuration drawings of an IPSec processing device of the first embodiment. In the first embodiment, as described previously, the PC 2, SGW 3, MN 4, AR 6, CN 8, and HA 9 may become IPSec processing devices.

FIG. 2A is a hardware configuration drawing of the IPSec processing device of the first embodiment. The SGW 3, AR 6, and HA 9 correspond to the IPSec processing device shown in FIG. 2A. Operations on the IPSec processing device are directed from the management terminal 10 by the manager.

The IPSec processing device shown in FIG. 2A includes a CPU 201, a memory 203, a hard disk 200, IP interfaces (206A, 206B), and a switch 205, which are connected with one another by a bus 204.

The CPU 201 executes a program stored in the memory 203. The memory 203 stores data necessary for a program and processing performed by the CPU 201. The memory 203 stores SPD, SADB, and user management information.

The hard disk 200 stores software and information of setting files of the IPSec processing device. The hard disk 200 does not need to be included in the IPSec processing device, and for example, may be connected to a hard disk of other devices connected to a network.

The IP interfaces (206A, 206B) transmit and receive IP packets, and at least one of them are included in the IPSec processing device. The IP interfaces (206A, 206B) may be wireless interfaces. The switch 205 unifies the IP interfaces (206A, 206B).

FIG. 2B is a hardware configuration drawing of the IPSec processing device of the first embodiment. The IPSec processing device shown in FIG. 2B is equipment such as the PC 2, MN 4, and CN 8 that may be substituted by general-purpose personal computers and the like.

The IPSec processing device shown in FIG. 2B includes a CPU 208, memory 209, hard disk 207, IP interface 211, and keyboard 212, which are connected with one another by a bus 210.

The CPU 208 executes a program stored in the memory 209. The memory 209 stores data necessary for a program and processing executed by the CPU 208.

The hard disk 207 stores software and information of setting files of the IPSec processing device. The hard disk 207 does not need to be included in the IPSec processing device, and for example, may be connected to a hard disk of other devices connected to a network.

The IP interface 211 transmits and receives IP packets, and at least one IP interface 211 is included. The IP interface 211 may be wireless interface. The keyboard 212 is an input device for operating the IPSec processing device. The input device may be a mouse without being limited to a keyboard.

FIG. 3 is a drawing showing the structure of a security policy 500 stored in a security policy database of the first embodiment.

The SPD stores SPs applied to IP packets inputted to and outputted from an IPSec processing device. An SP is a description of a method of processing IP packets inputted and outputted. In the SP, according to information of inputted and outputted IP packets, the existence or absence of application of IPSes processing and parameters of applied IPSec processing are described. The SP primarily comprises selector information 509, policy information 516, and SP identification information 522.

The selector information 509, which is compared with various information included in an put/output IP packet, is information for selecting an applied SP. The selector information 509 includes IP addresses (501, 504), port numbers (503, 504), protocol numbers (506, 507), and other information.

As the policy information 516, parameters of IPSec processing applied to an IP packet matching the selector information 509 is stored. The policy information 516 includes policy 510, security protocol 511, encapsulation mode 512, outer source IP address 513, outer destination IP address 514, and SPI value 515.

The policy 510 specifies whether to bypass or drop an IP packet matching selector information, or subject it to IPSec processing. FIG. 3 shows an example corresponding to the value of policy 510.

Other items constituting the policy information 516 are used when IPSec processing is applied. The security protocol 511 is a procedure of encryption communication, and for example, sets "ESP", which is one of protocols for data transfer through encryption. The encapsulation mode 512 stores a method of encapsulating a packet to be transmitted, and for example, "Tunnel" or "Transport". The outer source IP address 513 and the outer destination IP address 514 are used when encapsulating a packet to be transmitted in tunnel mode, and are added to an encrypted packet. The SPI value 515 is used to locate an encryption algorithm and a cryptography key in the destination of a packet.

The SP identification information 522 is information for flexible and easy execution of SP reference and deletion, and the setting of a retrieval order and a retrieval method. The SP identification information 522 includes retrieval type 517, priority 518, user management identifier 519, next SP pointer 520 for user management, and next SP pointer 521 for packet transfer.

Hereinafter, individual items of the SP identification information 522 will be described in detail. The retrieval type 517, priority 518, and next SP pointer for packet transfer 521 along with the structure of the SPD will be described.

FIG. 4 is a drawing for explaining the structure of SPD of the first embodiment and a retrieval order for the SPD. In the first embodiment, three types of SPDs are used: SPD 300 for preliminary retrieval, SPD 320 for fast retrieval, and SPD 340 for post retrieval. The retrieval type 517 shown in FIG. 3 specifies in which of three types of SPDs an SP is stored. The SPDs are retrieved in the order of SPD 300 for preliminary retrieval, SPD 320 for fast retrieval, and SPD 340 for post retrieval.

The SPD 300 for preliminary retrieval stores SPs (310, 311, 312) in a linear list form. For the link of the linear list, a next SP pointer 521 for packet transfer is used. Priority 518 indicates the priority of SPs, and represent higher priorities by its smaller values. SPs with higher priority are stored nearer the head of the linear list. Since retrieval begins with the head of the list to extract SPs, the sequentiality of SP can be secured.

The SPD 300 for preliminary retrieval, which is the first SPD to be retrieved, is useful to store SPs to be processed with the highest priority by a manager. For example, it is suitable to store system policies that are independent of terminals.

The SPD 320 for fast retrieval stores SPs (331, 332, 333) in a hash list form. The SPD 320 for fast retrieval calculates a hash value by using an IP address and other information, and stores SP in an area corresponding to the hash value. Hash values correspond to array numbers of the hash list 330. SPs with identical hash values are stored in a linear list form, and a leading SP is stored in the hash list. Unlike the linear retrieval that performs retrieval until a matching SP is found, from the head of the list, the SPD 320 for fast retrieval can increase SP retrieval speed by using the hash list 330.

The SPD 320 for fast retrieval is structured to be split every prefix length 502 of IP address. By this structure, the number of SP retrievals is further reduced, and even for a packet matching IP addresses (501, 504) included in the selector information 509, SPs can be set in units of networks.

Like the SPD 300 for preliminary retrieval, the SPD 340 for post retrieval stores SPs (341, 342, 343) in a linear list form. The SPD 340 for post retrieval sets SPs applied to IP packets not matching the SPD 300 for preliminary retrieval and the SPD 320 for fast retrieval. Therefore, the SPD 340 for post retrieval can be used for the setting of system default and the like of IPSec processing devices.

Figure 5:
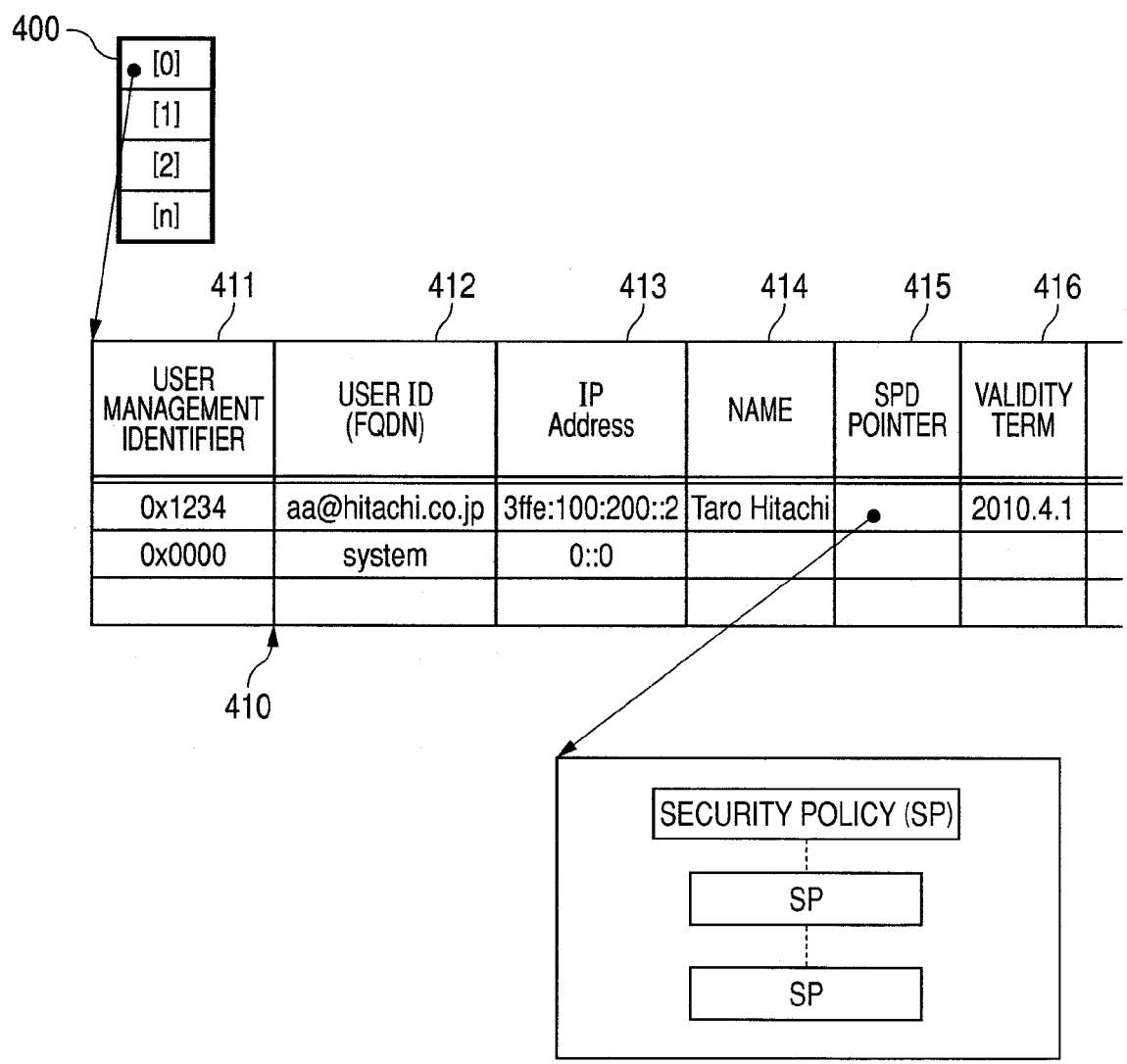
FIG. 5 is a drawing showing the construction of a security policy of a first embodiment.

The following describes a user management identifier 519 and a next pointer 520 for user management of the SP identification information 522 with reference to FIG. 5.

FIG. 5 is a drawing showing the structure of a user management table that stores SPs of the first embodiment in association with user information. A user management table 410 stores correspondences between user information and SPs. Records stored in the user management table 410 are managed by a hash list 400 for user information enable fast retrieval.

The user management table 410 includes a user managing identifier 411, a user ID 412, an IP address 413, a name 414, an SPD pointer 415, and a validity term 416.

The user management identifier 411 is an identifier uniquely identifying a user. The user management identifier 411 is created using a specific FQDN (Fully Qualified Domain Name) during setting of user information. The user management identifier 411 is stored in a user management identifier 519 of SP shown in FIG. 3 during SPD setting. When the user management identifier 411 is "0x0000", user information is managed as information for a system of an IPSec processing device.

The SPD pointer 415 stores a pointer to an SP applied to a relevant user. The SPD pointer 415 stores a pointer to the first SP set for the user. SPs are stored in a linear list form linked by the next SP pointer 520 for user management included in an SP shown in FIG. 3. Therefore, by locating the user managing identifier 411, all SPs applied to a relevant user can be obtained.

By constructing user information as described above, a manager can retrieve, set, and collectively delete SPs in units of users.

Figure 6:
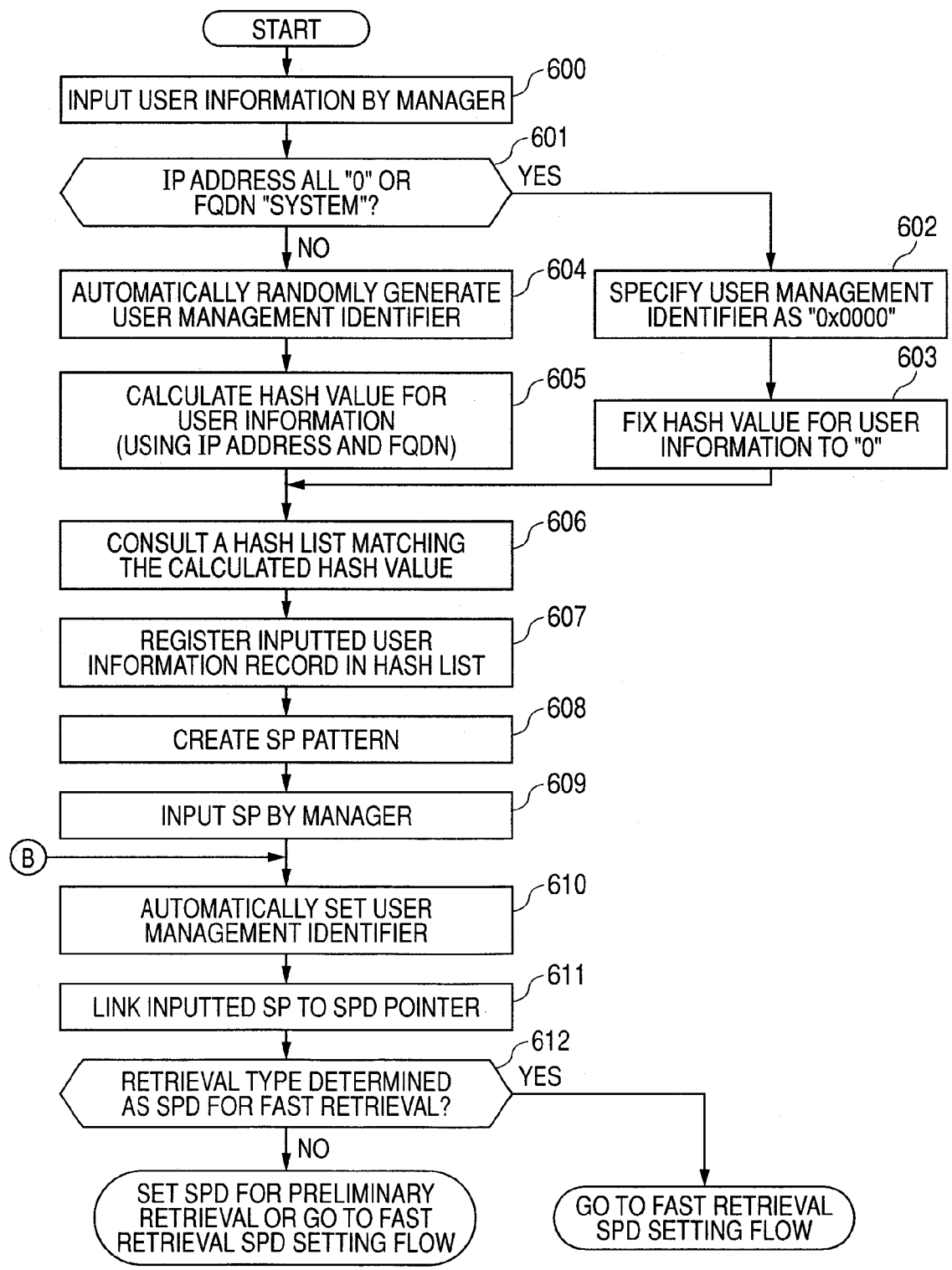
FIG. 6 is a flowchart showing a procedure for manually setting a security policy of a first embodiment by a manager.

FIG. 6 is a flowchart showing a procedure for adding a security policy to the security policy database of the first embodiment. In the first embodiment, the security policy is manually set by the manager. To add the security policy, the user to be applied is registered, and then the content of the security policy is inputted.

Specifically, the manager inputs items of the user management table 410 shown in the FIG. 5 (600). Although there are no special limitations on a method of inputting user information, one example is to display a pattern of the user management table 410 on a WEB interface and make input according to displayed items. Alternatively, a command line interface for setting an SPD may be provided for input, or a setting file may be created by the manager to read it from the command line interface. When inputted user information is already registered, an IPSec processing device acquires pertinent user information, and starts processing from processing of 608.

The following describes an analysis of user management information inputted by a manager. The IPSec processing device determines whether an inputted IP address 413 is all "0", or user ID 412 is "System" (601). If so (the result of 601 is "Yes") it fixedly registers "0x0000" indicative of a system-specific value of the IPSec processing device in the user management identifier 411 (602), and fixes a hash value for user information to "0" (603).

On the other hand, when the IP address 413 and the user ID 412 that are inputted by the manager do not match the system (the result of 601 is "No"), the IPSec processing device automatically randomly creates a user management identifier 411 (604). Furthermore, it calculates a hash value based on the inputted IP address 413 and user ID 412 (605).

After that, the IPSec processing device consults the hash list 400 for user information showed in FIG. 5, based on the obtained hash value (606). It registers the inputted user information in the hash list 400 (607), and terminates the setting of user management information.

The IPSec processing device displays a pattern of the SP shown in FIG. 3 as an SP for the user (608). The manager inputs an SP in the displayed pattern (609). The SP is inputted through the WEB interface or command line interface, like input for the user management table 410.

Upon completion of input of the SP, the IPSec processing device associates the user management information with the SP by setting the value of the user management identifier 411 created by the processing of 609 in the user management identifier 519 of the SP (610). It also stores a pointer to the newly inputted SP in the SPD pointer 415 of the user management table 410 (611).

Next, the IPSec processing device determines the inputted SPD retrieval type is "fast" (612). When the inputted retrieval type is "fast" (the result of 612 is "Yes"), it set the SP in the SPD for fast retrieval by use of the hash list. On the other hand, when the inputted retrieval type is not "fast" (the result of 612 is "No"), that is, when it is "preliminary" or "post", the IPSec processing device sets the SP in the SPD for preliminary retrieval or SPD for post retrieval by use of a linear list. A procedure for adding an SP to the SPD for preliminary retrieval or the SPD for post retrieval is shown in FIG. 7, and a procedure for adding an SP to the SPD for fast retrieval is shown in FIG. 8.

Figure 7:
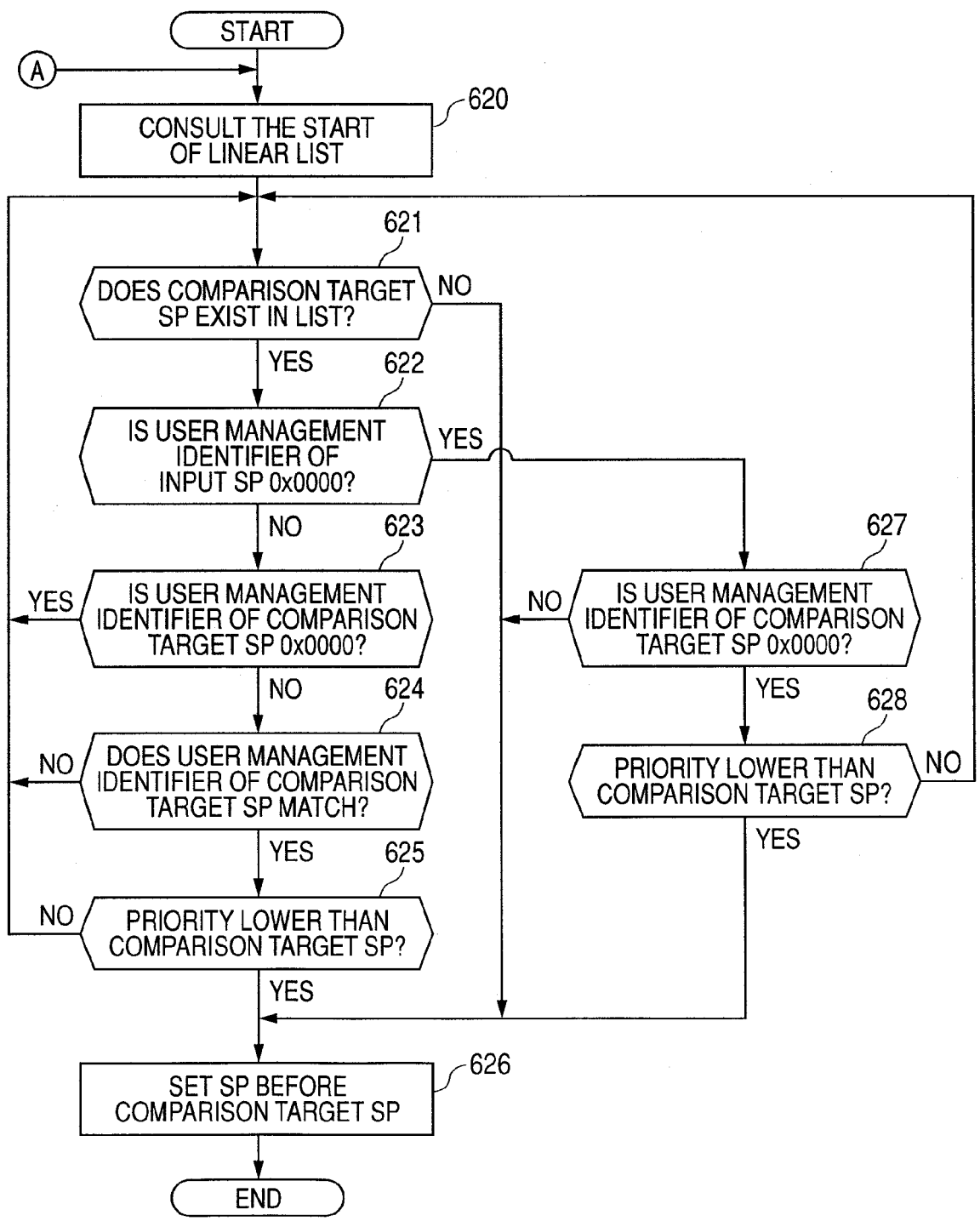
FIG. 7 is a flowchart showing a procedure for storing a security policy in a security policy database of a linear list format of a first embodiment.
Figure 8:
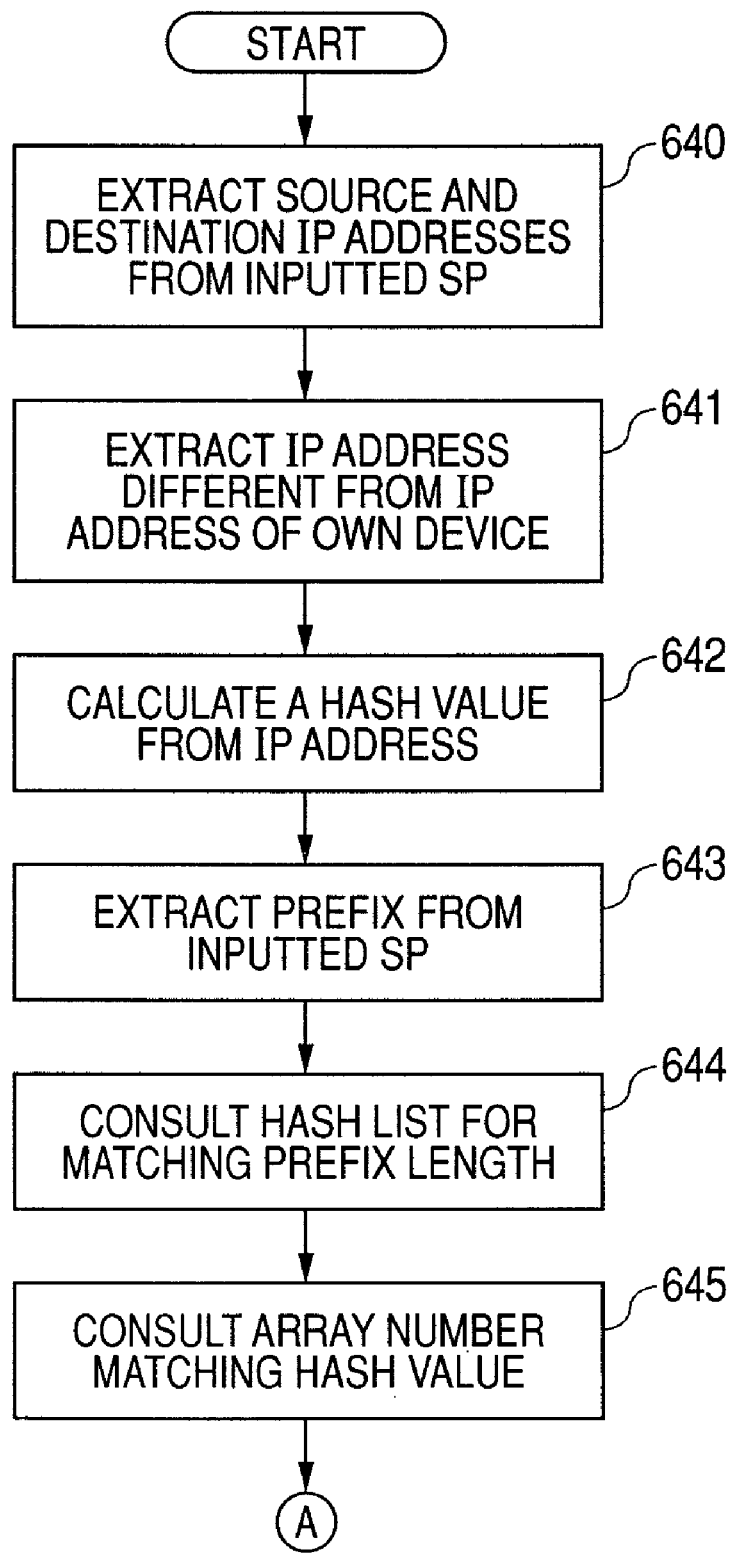
FIG. 8 is a flowchart showing a procedure for storing a security policy in a security policy database of a hash list format of a first embodiment.

FIG. 7 is a flowchart showing a procedure for setting an SPD by use of a linear list of the first embodiment. SPDs using a linear list include SPD for preliminary retrieval or SPD for post retrieval, as described previously.

The rules for setting SPs in the SPD for preliminary retrieval or the SPD for post retrieval have three characteristics described below. First, SPs for the system are set with a higher priority than SPs for general users. Second, SPs with a lower priority are preferentially set. Third, for the same priority, SPs earlier set are preferentially set. SPs for the system include, for example, system policies independent of terminals.

The following describes a procedure for setting SPs in detail with reference to FIG. 7. The IPSec processing device consults the head of the linear list to see SPs of comparison targets (620).

The IPSec processor determines whether or not SPs of comparison targets exist (621). When SPs of comparison targets do not exist (the result of 621 is "No"), it registers the SP inputted to a reference position of the linear list and terminates the processing (626).

On the other hand, when SPs of comparison targets exist (the result of 621 is "Yes"), it determines whether the user management identifier 519 of the inputted SP is "0x000" (622).

When the user management identifier 519 is '0x000' (the result of 622 is "Yes"), since the inputted SP is an SP for the system, the IPSec processing device preferentially registers the SP. Specifically, the IPSec processing device determines whether the user management identifier 519 of the SP of comparison target is "0x0000" (627).

When an SP for comparison target is an SP for the system (the result of 627 is "Yes"), the IPSec processing device compares the value of the priority 518 included in the SP (628). When the value of priority of SP inputted by the manager is smaller than the value of priority of SP of comparison target (the result of 628 is "Yes"), it registers the inputted SP so as to be positioned before the SP of comparison target on the linear list, and terminates the processing (626). When the value of priority is greater (the result of 628 is "No"), it returns to the processing of 621 to use SP located by a next SP pointer for packet transfer of SP of a current comparison target as SP of a new comparison target.

On the other hand, when the SP for comparison target is not an SP for the system (the result of 627 is "No"), the IPSec processing device registers the inputted SP so as to be positioned before the SP of comparison target, and terminates processing (626).

When the user management identifier 519 of the inputted SP is not '0x000' (the result of 622 is "No"), that is, when the inputted SP is an SP for user, the IPSec processing device determines whether the user management identifier 519 of the SP of comparison target is "0x0000" (623).

When the SP of comparison target is an SP for the system (the result of 623 is "Yes"), the IPSec processing device returns to the processing of 621 to use SP located by a next SP pointer for packet transfer of SP of a current comparison target as SP of a new comparison target.

On the other hand, when the SP for comparison target is an SP for user (the result of 623 is "No"), the IPSec processing device determines whether the user management identifiers 519 match each other (624). When they match (the result of 624 is "Yes"), it compares priority values contained in the SPs (625). When the priority value of the SP inputted by the manager is smaller than the priority value of the SP of comparison target (the result of 625 is "Yes"), the inputted SP is registered so as to be positioned before the SP of comparison target because of preferential retrieval, and terminates the processing (626).

When the user management identifiers 519 match each other (the result of 624 is "No"), the IPSec processing device returns to the processing of 621 to use SP located by a next SP pointer for packet transfer of SP of a current comparison target as SP of a new comparison target. Likewise, even when the user management identifiers 519 match each other, if the priority value of the SP inputted by the manager is greater than the priority value of the SP of comparison target (the result of 625 is "No"), it updates the SP of the current comparison target and returns to the processing of 621.

FIG. 8 is a flowchart showing a procedure for setting the SPD for fast retrieval by use of the hash list of the first embodiment.

The rules for setting SPs in the SPD for fast retrieval have two characteristics described below. First, to calculate a hash value, by using an IP address other than the IPsec processing device, the duplication of hash values is avoided and SP distribution efficiency is increased. Second, by providing a hash list for each prefix length, SP settings in units of networks and SP settings in units of IPSec processing devices can be managed separately.

The following describes a procedure for setting SPs in detail with reference to FIG. 8. The IPSec processing device extracts a source IP address 501 and a destination IP address 504 that are included in the SP inputted by the manager (640).

The IPSec processing device selects an IP address different from an IP address assigned to the IPSec processing device that performs this processing, from among the extracted IP addresses (641). This is because in the first embodiment, since a hash value is calculated using an IP address, if a hash value is calculated using an IP address of the IPSec processing device that performs this processing, the hash value tends to lean to a specific value. The IPSec processing device calculates a hash value by using the selected IP address (642).

The IPSec processing device extracts a prefix length corresponding to the IP address selected from the SP inputted by the manager (643). It acquires the has list 330 matching the prefix length (644). Furthermore, it consults the array number of the hash list 330 that matches the calculated hash value (645). When SPs having a same hash value exist, the SPs having the matching hash values are held in a linear list form, and an SP positioned in the head of the list is stored in the hash list 330. Therefore, a procedure for adding SP to the hash list 330 is the same as the SPD setting procedure of linear list form shown in FIG. 7, and SP stored in the hash list 330 that corresponds to a hash value is used as SP of comparison target to perform processing from a connector A of FIG. 7.

The following describes a procedure for consulting and deleting the SPD in which SPs are set as described above, in units of users.

Figure 9:
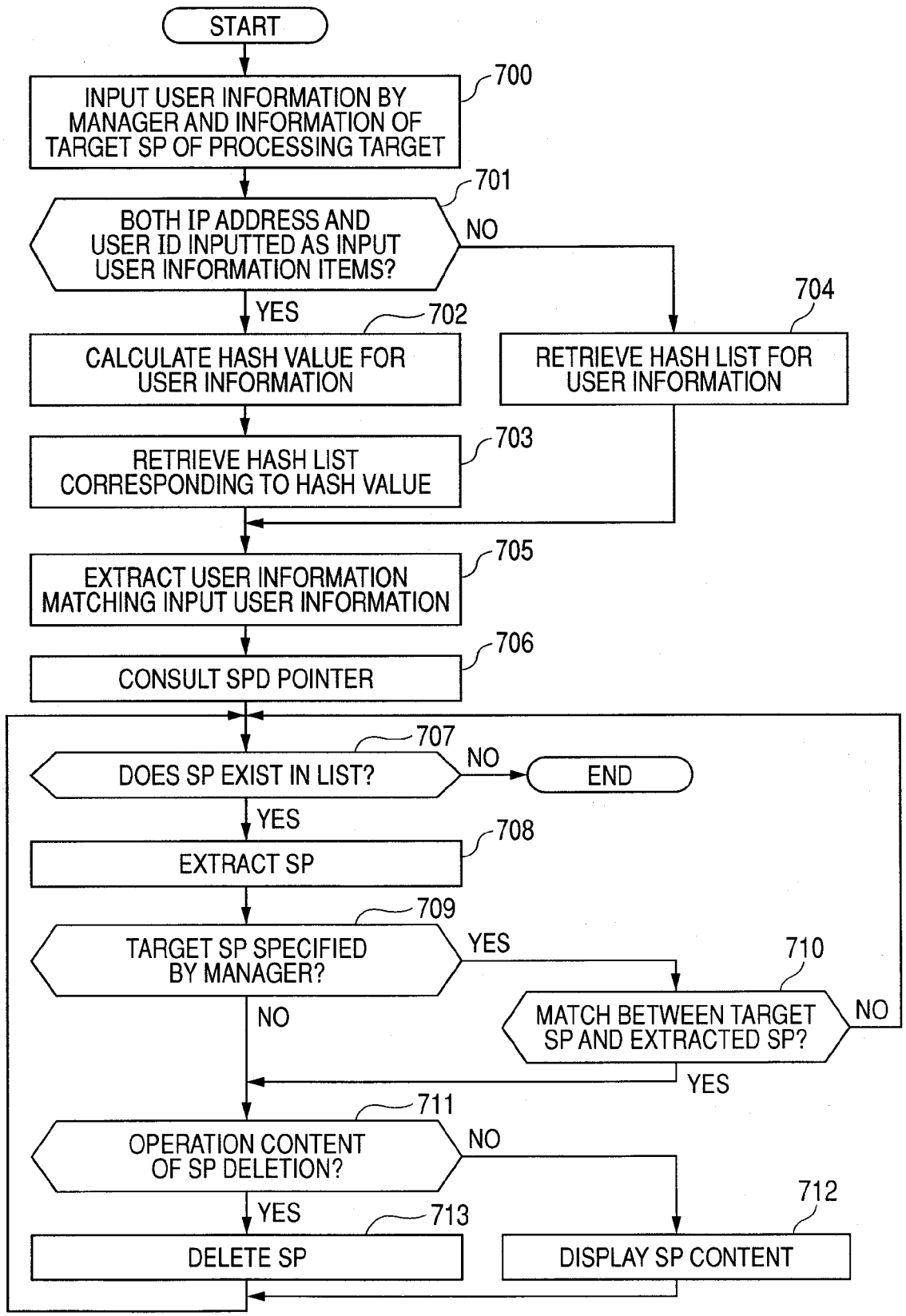
FIG. 9 is a flowchart showing a procedure for consulting or deleting security policies stored in a security policy database of the first embodiment.

FIG. 9 is a flowchart showing a procedure for consulting or deleting SPs stored in the SPD of the first embodiment.

The manager inputs items and SP items of the user management table 410 to be referenced or deleted (700). The items are inputted by the manager, for example, by displaying an input screen by the WEB interface or command line interface.

The IPSec processing device determines whether both an IP address and a user ID have been inputted as inputted items of user management information (701). When the inputted items are only an IP address or user ID (the result of 701 is "No"), it retrieves all user information registered in the hash list 400 for user information (704). It compares user information stored in the user information 410 with the IP address or user ID inputted by the manager, and extracts matching user information 410 (705).

On the other hand, when the manager inputs both of the IP address and the user ID (the result of 701 is "Yes"), the IPSec processing device calculates a hash value corresponding to the hash list 400 for user information, based on the inputted information (702). It retrieves user information stored in an area of the hash list 400 that corresponds to the calculated hash value (703). Moreover, it makes comparison with the IP address or user ID inputted by the manager to extract matching user information 410 (705).

The IPSec processing device acquires an SPD pointer 415 registered in the extracted user information 410 (706). It determines whether an SP applied to an extracted user exists (707). When the SP does not exist (the result of 707 is "No"), it displays a message indicating nonexistence and terminates the processing.

When an SP applied to the extracted user exists (the result of 707 is "Yes"), the IPSec processing device extracts the SP (708). Furthermore, the IPSec processing device determines whether an SP of the target to be consulted or deleted by the manager is specified (709). When specified (the result of 709 is "Yes"), it determines whether the extracted SP matches the inputted SP (710). When they do not match (the result of 710 is "No"), it consults a next SP pointer for user management of the extracted SP and returns to the processing of 707 to use a next SP registered in a linear list as a newly extracted SP.

When the extracted SP matches the SP inputted by the manager (the result of 710 is "Yes"), or when the manager specifies no SP (the result of 709 is "No"), the IPSec processing device performs processing according to an operation content specified by the manager (711). When an operation content specified by the manager is "Consult" (the result of 711 is "Yes"), it displays the extracted SP (712). When a specified operation content is "Delete" (the result of 711 is "No"), it deletes the extracted SP.

By executing the above processing, the manager can consult SPs in units of users and can perform setting status confirmation and the prevention of setting leak for each of users.

Figure 10:
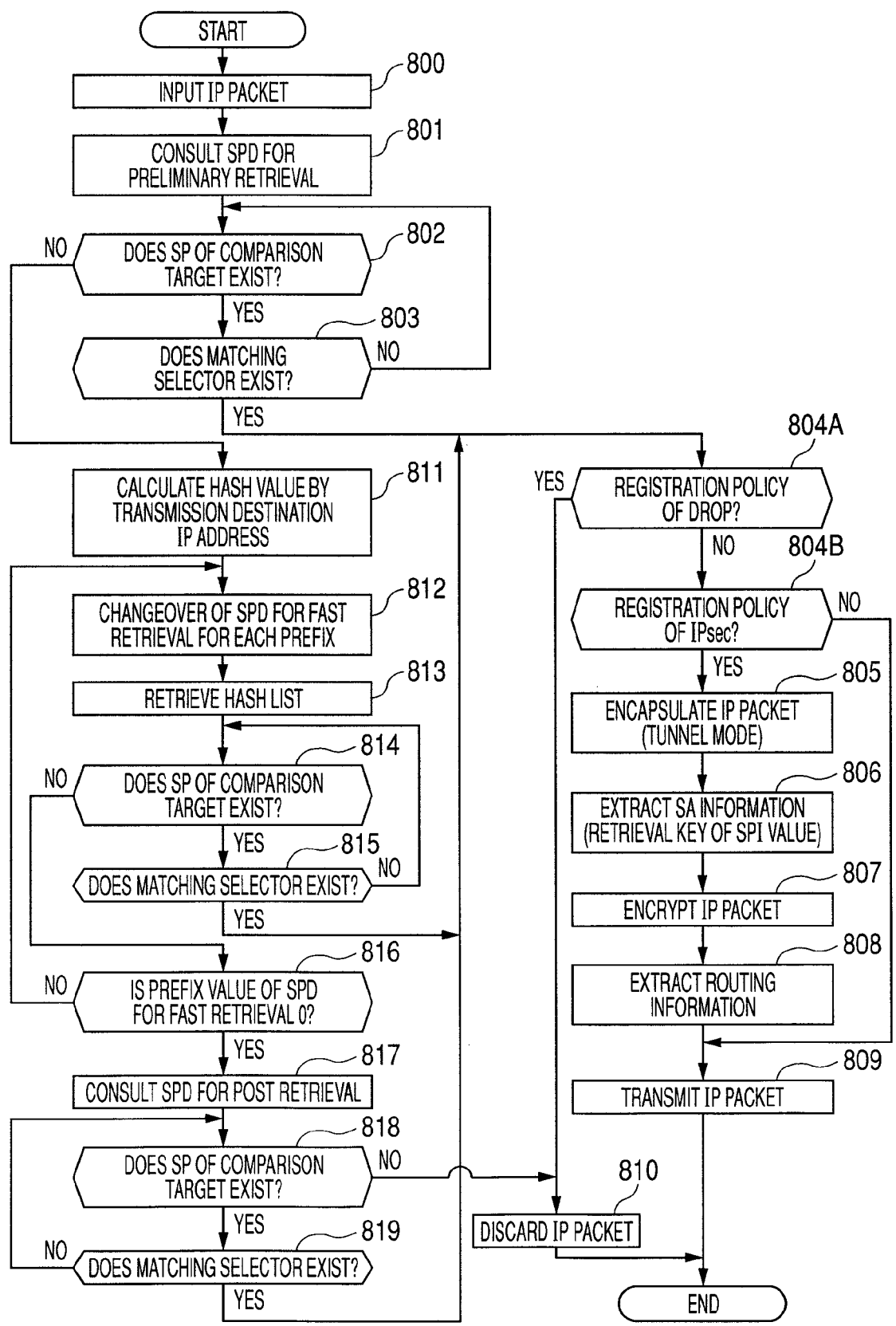
FIG. 10 is a flowchart showing a procedure for transmitting IP packets of a first embodiment.

FIG. 10 is a flowchart showing a procedure by which the IPSec processing device of the first embodiment transmits or transfers IP packets.

During transmission or transfer, the IPSec processing device basically retrieves SPs in the order of the SPD 300 for preliminary retrieval, the SPD 320 for fast retrieval, and the SPD 340 for post retrieval. On extracting an SP matching the IP packet to be transmitted, the IPSec processing device performs IPSec processing for the IP packet. based on the policy information 516 included in the SP.

Specifically, on receiving the IP packet to be transmitted or transferred, the IPSec processing device consults the SPD 300 for preliminary retrieval (801). It extracts an SP stored in the head of the SPD 300 for preliminary retrieval being a linear list, and uses it as a comparison target.

The IPSec processing device determines whether an SP of comparison target exists (802). When an SP of comparison target exists (the result of 802 is "Yes"), it determines whether an IP address and other information included in the inputted IP packet match selector information of SP of comparison target (803).

When the information included in the inputted IP packet does not match the selector information of SP of comparison target (the result of 803 is "No"), the IPSec processing device uses an SP indicated by a next SP pointer 521 for packet transfer as an SP of a new comparison target. It repeats processings of 802 and 803 until an SP having selector information matching the information included in the inputted IP packet is extracted (the result of 803 is "Yes"), or until SPs of comparison target become inexistent (the result of 802 is "No").

On the other hand, when the information included in the inputted IP packet matches selector information of SP of comparison target (the result of 803 is "Yes"), the IPSec processing device performs IPSec processing from 804A to 810. A detailed procedure of IPSec processing will be described later.

When an SP matching the SPD 300 for preliminary retrieval does not exist (the result of 802 is "No"), the IPSec processing device retrieves a matching SP from the SPD 320 for fast retrieval.

The IPSec processing device calculates a hash value based on an address IP address included in the inputted IP packet (811). Next, it uses an SPD 320A for fast retrieval having the largest prefix length as a first retrieval target (812), and retrieves an SP corresponding to the calculated hash value, based on a corresponding hash list 330A (813). The acquired SP is used as a comparison target.

Then, the IPSec processing device determines whether an SP of comparison target exists (814). When an SP of comparison target exists (the result of 814 is "Yes"), it determines whether an IP address and other information included in the inputted IP packet match selector information of SP of comparison target (815).

When the information included in the inputted IP packet does not match the selector information of SP of comparison target (the result of 815 is "No"), the IPSec processing device uses an SP indicated by the next SP pointer 521 for packet transfer as an SP of a new comparison target. It repeats processings of 814 and 815 until an SP having selector information matching the information included in the inputted IP packet is extracted (the result of 815 is "Yes"), or until SPs of comparison target become inexistent (the result of 814 is "No").

On the other hand, when the information included in the inputted IP packet matches selector information of SP of comparison target (the result of 815 is "Yes"), the IPSec processing device performs IPSec processing from 804A to 810.

When there is no SP whose selector information matches the information included in the inputted IP packet (the result of 815 is "No"), the IPSec processing device subtracts the prefix length of a retrieval target, and determines whether the resulting value becomes zero (816). When the prefix length is equal to or greater than zero (the result of 816 is "No"), it retrieves an SPD for fast retrieval corresponding to the subtracted prefix length (812) to continue SP retrieval.

When the prefix length becomes zero (the result of 816 is "Yes"), and a relevant SP cannot be extracted as a result of retrieving the SPD 320 for fast retrieval, the IPSec processing device retrieves a matching SP from the SPD 340 for post retrieval.

The IPSec processing device consults the SPD 340 for post retrieval (817), and extracts an SP stored in the head to use it as an SP for comparison target. Then, the IPSec processing device determines whether an SP of comparison target exists (818). When an SP of comparison target exists (the result of 818 is "Yes"), it determines whether an IP address and other information included in the inputted IP packet match selector information of SP of comparison target (819).

When the information included in the inputted IP packet does not match the selector information of SP of comparison target (the result of 819 is "No"), the IPSec processing device uses an SP indicated by a next SP pointer 521 for packet transfer as an SP of a new comparison target. It repeats processings of 818 and 819 until an SP having selector information matching the information included in the inputted IP packet is extracted (the result of 819 is "Yes"), or until SPs of comparison target become inexistent (the result of 818 is "No").

On the other hand, when the information included in the inputted IP packet matches selector information of SP of comparison target (the result of 819 is "Yes"), the IPSec processing device performs IPSec processing from 804A to 810. When there is no SP whose selector information matches the information included in the inputted IP packet (the result of 818 is "No"), the IPSec processing device drops the inputted IP packet (810).

When an SP whose selector information matches IP address information and the like of the inputted IP packet is extracted (the result of 803, 815, and 819 is "Yes"), the IPSec processing device performs IPSec processing, based on policy information 516 included in the SP. The IPSec processing is described below.

The IPSec processing device acquires policy 510 included in the extracted SP. The policy 510 stores the content of IPSec processing to be applied. When the policy 510 is "Drop" (the result of 804A is "Yes"), the IPSec processing device drops the inputted IP packet (810). When the policy 510 is "Bypass" (the result of 804B is "No"), it transfers the inputted IP packet without modifications (809).

When the policy 510 is "IPSec" (the result of 604B is "Yes"), the IPSec processing device performs processings from 805 to 808 as IPSec processing. The IPSec processing device consults an encapsulation mode 512. When tunnel mode has been set in the content of encapsulation mode 512, it performs capsulation processing to add an IP header to the inputted IP packet, using an outer source IP address 513 and an outer destination IP address 514 (805).

Next, the IPSec processing device acquires, based on the SPI value 515, an SA that includes key information, authentication, and information of an encryption algorithm necessary for to apply IPSec, from SADB (806). It encrypts the inputted IP packet, based on SA (807). Finally, it decides a transmission path of the IP packet subjected to IPSec processing and (808), and transmits it, based on the path (809).

Figure 11:
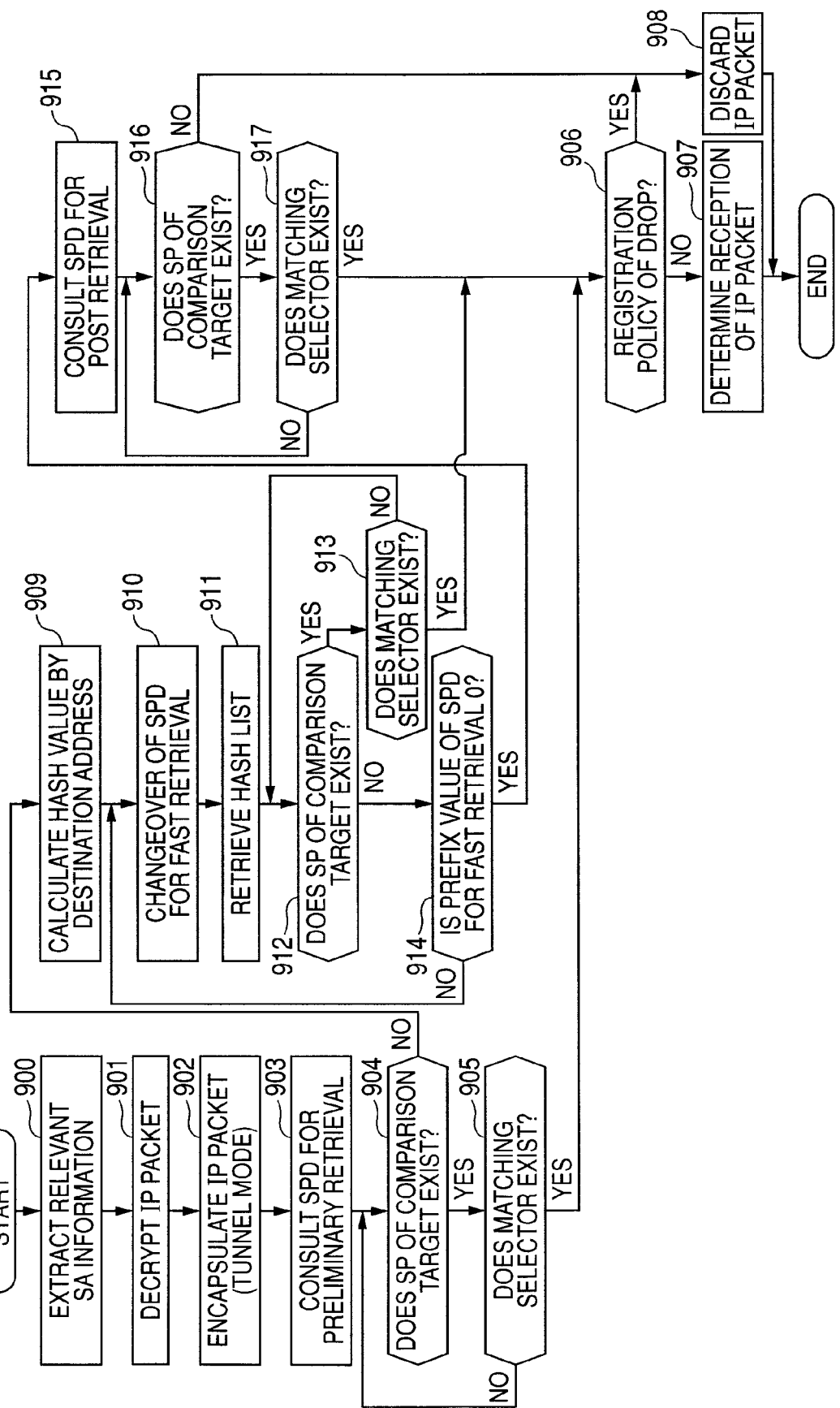
FIG. 11 is a flowchart showing a procedure for receiving IP packets of a first embodiment.

FIG. 11 is a flowchart showing a procedure for the IPSec processing device of the first embodiment to receive an IP packet to which IPSec is applied.

The IPSec processing device extracts an SA, based on an SPI value and a source IP address included in a received IP packet to which IPSec is applied (900), and decrypts the IP packet (901). When the IP packet has two pieces of IP header information, it decapsulate the IP packet because of IPSec processing in the tunnel mode (902). By the above processing, the restoration of the received IP packet is completed. For the restored IP packet, the IPSec processing device, like the transmission processing, retrieves the SPD 300 for preliminary retrieval, the SPD 320 for fast retrieval, and the SPD 340 for post retrieval in that order to acquire an SP.

The IPSec processing device consults the SPD 300 for preliminary retrieval (903). It extracts an SP stored in the head of the SPD 300 for preliminary retrieval being a linear list, and uses it as a comparison target.

The IPSec processing device determines whether an SP of comparison target exists (904). When an SP of comparison target exists (the result of o04 is "Yes"), it determines whether an IP address and other information included in the restored IP packet matches selector information of SP of comparison target (905).

When the information included in the restored IP packet does not match the selector information of SP of comparison target (the result of 905 is "No"), the IPSec processing device uses an SP indicated by a next SP pointer 521 for packet transfer as an SP of a new comparison target. It repeats processings of 904 and 905 until an SP having selector information matching the information included in the inputted IP packet is extracted (the result of 905 is "Yes"), or until SPs of comparison target become inexistent (the result of 904 is "No").

On the other hand, when the information included in the restored IP packet matches the selector information of SP of comparison target (the result of 905 is "Yes"), the IPSec processing device performs IPSec processing in and after 906 for the restored IP packet. A detailed procedure of the IPSec processing will be described later.

When a matching SP does not exist in the SPD 300 for preliminary retrieval (the result of 904 is "No"), the IPSec processing device retrieves a matching SP form the SPD 320 for fast retrieval.

The IPSec processing device calculates a hash value, based on an address IP address included in the restored IP packet (909). Next, it uses the SPD 320A for fast retrieval having the largest prefix length as a first retrieval target (910), and retrieves an SP corresponding to the calculated hash value, based on the corresponding hash list 330A (911). The acquired SP is used as a comparison target.

Then, the IPSec processing device determines whether an SP of comparison target exists (912). When an SP of comparison target exists (the result of 912 is "Yes"), it determines whether an IP address and other information included in the restored IP packet match selector information of SP of comparison target (913).

When the information included in the restored IP packet does not match the selector information of SP of comparison target (the result of 913 is "No"), the IPSec processing device uses an SP indicated by the next SP pointer 521 for packet transfer as an SP of a new comparison target. It repeats processings of 912 and 913 until an SP having selector information matching the information included in the restored IP packet is extracted (the result of 913 is "Yes"), or until SPs of comparison target become inexistent (the result of 912 is "No").

On the other hand, when the information included in the restored IP packet matches selector information of SP of comparison target (the result of 913 is "Yes"), the IPSec processing device performs IPSec processing in and after 906 for the restored IP packet.

When there is no SP whose selector information matches the information included in the restored IP packet (the result of 913 is "No"), the IPSec processing device subtracts the prefix length of a retrieval target, and determines whether the resulting value becomes zero (914). When the prefix length is equal to or greater than zero (the result of 914 is "No"), it retrieves an SPD for fast retrieval corresponding to the subtracted prefix length (812) to continue SP retrieval.

When a pertinent SP cannot be extracted in retrieval of the SPD 320 for fast retrieval having a prefix length of zero (the result of 914 is "Yes"), the IPSec processing device continues to retrieve a matching SP from the SPD 340 for post retrieval.

The IPSec processing device consults the SPD 340 for post retrieval (915), and extracts an SP stored in the head to use it as an SP for comparison target. Then, the IPSec processing device determines whether an SP of comparison target exists (916). When an SP of comparison target exists (the result of 916 is "Yes"), it determines whether an IP address and other information included in the restored IP packet match selector information of SP of comparison target (917).

When the information included in the restored IP packet does not match the selector information of SP of comparison target (the result of 917 is "No"), the IPSec processing device uses an SP indicated by the next SP pointer 521 for packet transfer as an SP of a new comparison target. It repeats processings of 916 and 917 until an SP having selector information matching the information included in the restored IP packet is extracted (the result of 917 is "Yes"), or until SPs of comparison target become inexistent (the result of 916 is "No").

On the other hand, when the information included in the restored IP packet matches selector information of SP of comparison target (the result of 917 is "Yes"), the IPSec processing device performs IPSec processing in and after 906 for the restored IP packet. When there is no SP whose selector information matches the information included in the inputted IP packet (the result of 916 is "No"), the IPSec processing device drops the restored IP packet (908).

When an SP whose selector information matches IP address information and the like of the restored IP packet is extracted (the result of 905, 913, and 917 is "Yes"), the IPSec processing device performs IPSec processing, based on policy information 516 included in the SP. The IPSec processing is described below.

The IPSec processing device acquires policy 510 included in the extracted SP. When the policy 510 is "Drop" (the result of 906 is "Yes"), the IPSec processing device drops the received IP packet (908). When the policy 510 is not "Drop" (the result of 906 is "No"), it determines the reception of the IP packet (907).

According to the first embodiment, since SPDs can be classified as preliminary, fast, and post for specification, the sequentiality of SP can be clearly set. Since plural SPs are stored distributedly, the number of comparisons between SP and IP packet can be significantly reduced during execution of IPSec processing. Therefore, the delay of transfer speed can be reduced during encryption communication with IPSec applied.

Furthermore, according to the first embodiment, SPD management operation can be simplified. Specifically, since SP setting, reference, and collective deletion are enabled for each of users, the confirmation of SP setting status, the prevention of SP setting failure, the discovery of contradictory SP setting, and the prevention of deletion of other users' SP due to wrong operation can be achieved.

SPD and user management information of the first embodiment may be applied to firewall apparatuses or packet filtering apparatuses that build a database using an IP address and a user ID as retrieval key. By applying them to firewall apparatuses or packet filtering apparatuses, database retrieval speed and user operability can be increased.

Second Embodiment

In the first embodiment, a procedure for manually setting SP by the manager is described, while in the second embodiment, during automatic exchange of encryption key with communication parties, SP and entries of user management information are created based on information of received packets. System configuration is the same between the first embodiment and the second embodiment.

In the second embodiment, a description is made of an example of exchanging encryption key according to a procedure of IKE (Internet Key Exchange) being a key exchange protocol.

In normal IKE processing, SPD and SA are only dynamically set. In the second embodiment, user management information is automatically created during IKE negotiation processing and is stored in association with SPD. Detailed descriptions are given below.

Figure 12:
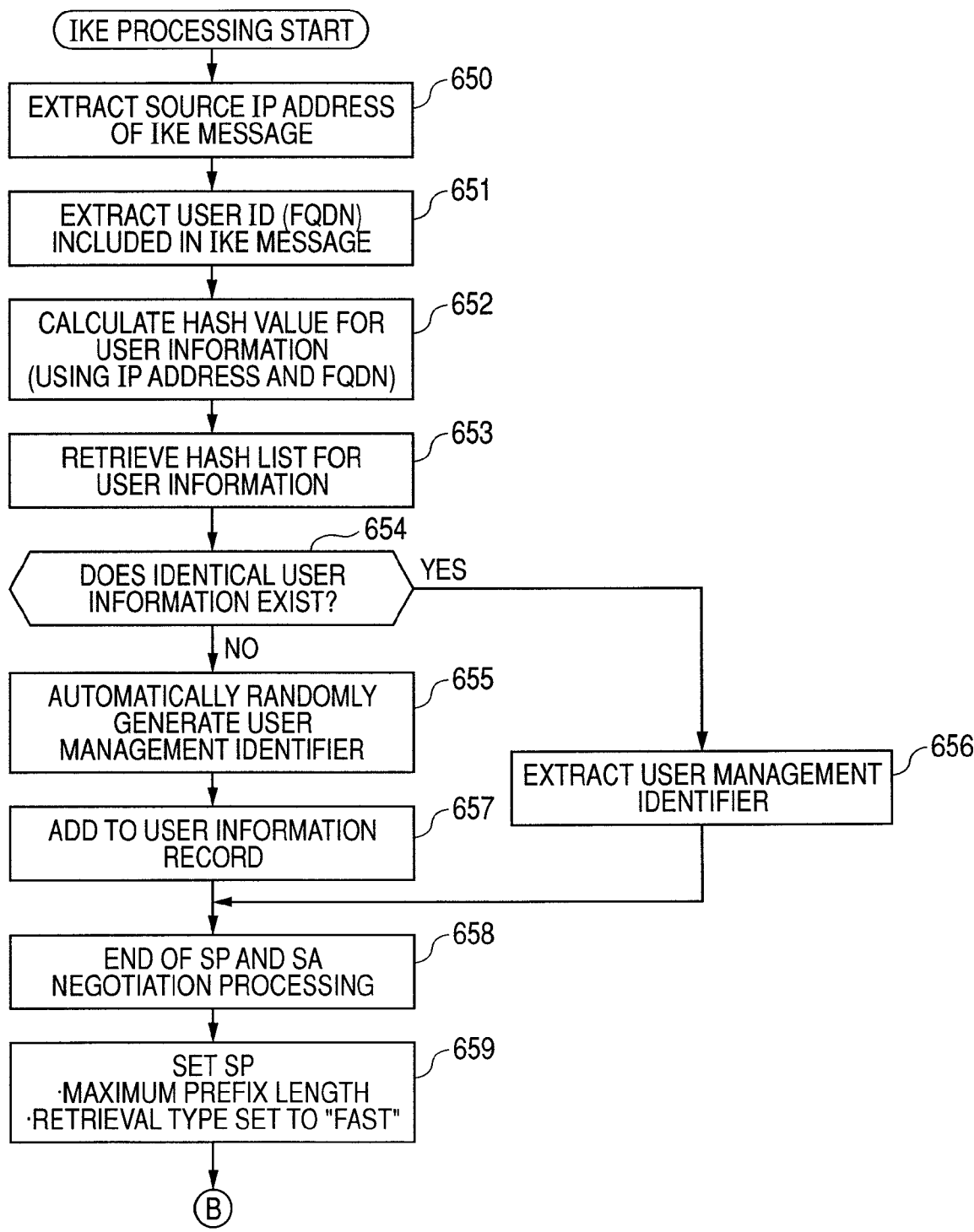
FIG. 12 is a flowchart showing a procedure for automatically creating a security policy database and user information for storage by using an internet key exchange protocol of a second embodiment.

FIG. 12 is a flowchart showing a procedure for setting SPD during IKE negotiation processing of the second embodiment. This processing is started, triggered by an IKE negotiation request from IPSec processing device to serve as a communication party.

The IPSec processing device extracts the IP address of a source included in an IKE message as information necessary for the generation of user management table 410 (650). Then, it extracts a user ID (FQDN information) used in authentication processing executed in the IKE negotiation (651).

The IPSec processing device calculates a hash value for user information based on an IP address and a user ID of the extracted source (652), and retrieves the hash list 400 (653) to determine whether identical user information exists, through comparison with the extracted IP address and user ID of the source (654). When identical user information exists (the result of 654 is "Yes"), it extracts user management identifier 411 already registered (656), and waits until the negotiation processing of SP and SA by the IKE negotiation is completed (658).

On the other hand, when identical user information does not exist (the result of 654 is "No"), the IPSec processing device automatically generates a user management identifier 411 (655), and newly registers a record in the user management table 410 (657). It waits until the negotiation processing of SP and SA by the IKE negotiation is completed (658).

On the negotiation processing of SP and SA by the IKE negotiation, the IPSec processing device starts the setting of the SP (659). It sets the prefix length 502 of the source and the prefix length 505 of the destination to the longest value, and further sets the value of the retrieval type 517 of SPD to "Fast". The setting of other items of SP is the same as the procedure described in the first embodiment. Specifically, the processing may be started at the point (the connector B of FIG. 6) of termination of the manager's SP input processing 609 shown in FIG. 6.

In the second embodiment, when an SPD is dynamically set by IKE, SPs can be automatically set in the SPD 320 for fast retrieval, and at the same time, records of the user information management table 410 can be created. Therefore, the manager can create SPs along with user management information without having to set SPs at any time. Since user management information is created at the same time, SPDs can be managed on a user basis also for SPs not set by the manager.

The second embodiment is suitably applied to the mobile unit IP communication shown in FIG. 1B. Particularly, in the case of HA 9, since IPSec communication is performed with plural MNs 4, the number of SP settings becomes enormous. In this case, although it is difficult for the manager to manually set an SPD, SPD management can be simplified by applying the semiconductor.

What is claimed is:

1. An IPSec processing device that performs communications by encrypting IP packets exchanged between a first IP network and a second IP network,
    wherein the IPSec processing device includes a security policy database that stores security policies,
    wherein the security policy database includes a first security policy database, a second security policy database, and a third security policy database,
    wherein the first security policy database and the third security policy database include a linear list structure,
    wherein the second security policy database includes a hash list structure,
    wherein the IPSec processing device, when performing at least one of transmission and reception of the IP packet, retrieves a security policy to be applied to the IP packet in the order of the first security policy database, the second security policy database, and the third security policy database; and
    wherein the IPSec processing device stores security policies applied to system-based communications having higher priority than inter-user communications in the security policy databases as security policies for the system, and disposes the security policies for the system in positions preferentially retrieved.

2. The IPSec processing device according to claim 1,
    wherein the security policies are sorted in the order in which they are checked in retrieval, and
    wherein the IPSec processing device stores the sorted security policies in the first security policy database, the second security policy database, or the third security policy database.

3. The IPSec processing device according to claim 1,
    wherein the security policies include priority with which they are checked in retrieval, and
    wherein the IPSec processing device performs retrieval according to the priority.

4. The IPSec processing device according to claim 1, wherein the second security policy database is split by the prefix length of an IP address included in the IP packet.

5. The IPSec processing device according to claim 1,
    wherein the IPSec processing device stores the security policies in the security policy databases in association with information of users to whom the security policies are applied, and upon receiving specification of users to whom the security policies are applied, retrieves security policies associated with the specified users.

6. The IPSec processing device according to claim 5, wherein the IPSec processing device retrieves the security policies at once for each of the specified users.

7. The IPSec processing device according to claim 5,
    wherein the IPSec processing device exchanges an encryption key with an IPSec processing device of a communication destination, and creates the security policies, based on an IP address and user information included in a packet received when exchanging the encryption key.

8. A network system including an IPSec processing device that performs communications by encrypting IP packets exchanged between a first IP network and a second IP network,
    wherein the IPSec processing device exchanges an encryption key with an IPSec processing device of a communication destination, creates the security policies, based on an IP address and user information included in a packet received when exchanging the encryption key, and includes a security policy database that stores the security policies,
    wherein the security policy database includes a first security policy database, a second security policy database, and a third security policy database,
    wherein the first security policy database and the third security policy database include a linear list structure,
    wherein the second security policy database includes a hash list structure,
    wherein the IPSec processing device, when performing at least one of transmission and reception of the IP packet, retrieves a security policy to be applied to the IP packet in the order of the first security policy database, the second security policy database, and the third security policy database, and
    wherein the IPSec processing device stores security policies applied to system-based communications having higher priority than inter-user communications in the security policy databases as security policies for the system, and disposes the security policies for the system in positions preferentially retrieved.

9. The network system according to claim 8,
wherein the security policies are sorted in the order in which they are checked in retrieval, and
wherein the IPSec processing device stores the sorted security policies in the first security policy database, the second security policy database, or the third security policy database.

10. The network system according to claim 8,
wherein the security policies include priority with which they are checked in retrieval, and
wherein the IPSec processing device performs retrieval according to the priority.

11. The network system according to claim 8,
wherein the second security policy database is split by the prefix length of an IP address included in the IP packet.

12. The network system according to claim 8,
wherein the IPSec processing device stores the security policies in the security policy databases in association with information of users to whom the security policies are applied, and upon receiving specification of users to whom the security policies are applied, retrieves security policies associated with the specified users.

13. The network system according to claim 12,
wherein the IPSec processing device retrieves the security policies at once for each of the specified users.

* * * * *